United States Patent
Agrahara

(10) Patent No.: US 7,813,621 B2
(45) Date of Patent: Oct. 12, 2010

(54) SYNCHRONIZED STREAMING LAYER WITH PRESENTATION LAYER

(75) Inventor: Aravind C. Agrahara, Fremont, CA (US)

(73) Assignee: Magnum Semiconductor, Inc., Milpitas, CA (US)

( * ) Notice: Subject to any disclaimer, the term of this patent is extended or adjusted under 35 U.S.C. 154(b) by 1601 days.

(21) Appl. No.: 11/089,458

(22) Filed: Mar. 25, 2005

(65) Prior Publication Data

US 2006/0008251 A1  Jan. 12, 2006

Related U.S. Application Data

(60) Provisional application No. 60/585,072, filed on Jul. 6, 2004.

(51) Int. Cl.
*H04N 7/00* (2006.01)

(52) U.S. Cl. .......................... 386/95; 386/83; 386/125; 715/723

(58) Field of Classification Search .................. 386/46, 386/52, 83, 95, 123–126; 715/723, 727, 715/730, 760
See application file for complete search history.

(56) References Cited

U.S. PATENT DOCUMENTS

| 2002/0131511 A1* | 9/2002 | Zenoni | 375/240.28 |
| 2003/0164847 A1* | 9/2003 | Zaima et al. | 345/723 |
| 2005/0053365 A1* | 3/2005 | Adams et al. | 386/125 |

\* cited by examiner

*Primary Examiner*—Thai Tran
*Assistant Examiner*—Mishawn Dunn
(74) *Attorney, Agent, or Firm*—Robert Platt Bell

(57) ABSTRACT

A "tag" is attached to streaming video data as it is streamed from the streaming layer to the presentation engine. Each frame containing a button or other user feature also has a "tag" associated with it. When the presentation engine processes a packet of data, it updates a state variable with the tag associated with the packet of data. The streaming layer can query this state variable at any point to get the tag associated with the currently rendered unit. When the user clicks on a button or feature, the streaming layer, rather than utilizing an associated operation in the data being streamed, instead uses the tag associated with the frame being displayed and then takes the appropriate action. The invention may also be used to provide frame-accurate editing features to allow streaming video data to be indexed or reversed to a frame-accurate level.

15 Claims, 3 Drawing Sheets

SYNCHRONIZED STREAMING LAYER WITH PRESENTATION LAYER

CROSS-REFERENCE TO RELATED APPLICATIONS

The present application claims priority from Provisional U.S. Patent Application No. 60/585,072 filed on Jul. 6, 2004, and incorporated herein by reference.

FIELD OF THE INVENTION

The present invention relates to Digital Versatile Disc (DVD) playback systems. In particular, the present invention is directed toward a method and apparatus for synchronizing streaming layer operations with presentation layer operations in a DVD player.

BACKGROUND OF THE INVENTION

FIG. 1 is a simplified block diagram of a Prior Art DVD player 100. For the purposes of illustration, a typical DVD playback system 100 is illustrated as being comprised of a streaming layer 120 and a presentation layer or engine 140. Although illustrated here as blocks in a block diagram, streaming layer 120 and presentation engine 140 may be provided in whole or in part as software and/or firmware elements in a DVD playback device 100.

Streaming layer 120 may encompass the operations of data retrieval from data source (DVD) 110 and disc access navigation 130. Streaming layer 120 receives a stream of video data in Motion Picture Expert Group (MPEG) format (e.g., MPEG-2) or the like, from DVD 110. Disc access Navigator 130 may receive input signals from a user via remote control 155 or the like to control which segments of DVD 110 are played, or to activate special features from DVD 110, or other DVD operations (pause, reverse, fast-forward, or the like). Thus, streaming layer 120 is also responsible for handling user operations (since user operations are typically handled at the navigator level).

Presentation engine 140 encompasses decode and render operations to decode DVD data from data source 110 and present an image on display 150 and audio output on speakers 160A and 160B. Since data from DVD 110 may be in MPEG-2 or other compressed formats, presentation engine 140 is used to decode this data and convert it into audio and video outputs which are compatible with display 150 and speakers 160A and 160B. Presentation engine 140 also synchronizes the audio and video portions such that the output is properly synchronized. Presentation engine may output signals in a number of formats including National Television Standards Committee (NTSC), Phase Alternating Lines (PAL), Systeme Electronique Couleur Avec Memoire (SECAM) or High Definition Television (HDTV) video, in interlaced or sequential scan formats. Audio output may be embedded into these video signals and/or may be output as a separate signal in digital form, or as analog outputs in a number of formats including various surround sound formats known in the art. Two speakers 160A and 160B are shown here for purposes of illustration. Other numbers of speakers may be used, as in a home theater installation, or a speaker in the display (e.g., television) 150 may be used for audio output.

When streaming data from DVD 110 through a DVD player 100 to a television or other output display 150, a time discontinuity may exist between the image being displayed on display 150 and the data being streamed from the disc 110. In other words, in a typical system, a time lag of processing data between the streaming layer 120 and the presentation engine 140.

The time lag of processing data between the streaming layer 120 and presentation engine 140 arises at least in part from a need to buffer as much data as possible in buffer 140A to improve performance of DVD player 100. Buffering data in buffer 140A allows for smooth playback even if certain disk read operations take a longer time than usual because of scratches or bad sectors. Reads from the disk could also take a longer time whenever the playback is forced to seek to different positions on the disk, since the process of seeking for data on an optical media drive is time consuming. Without buffer 140A, the output on display 150 may be interrupted if the processing of data at streaming layer 120 falls behind the generation of data at presentation engine 140 because of bad sector reads. As MPEG-2 and other compressed data is compressed in a non-uniform fashion (depending upon content), a buffer 140A is necessary to ensure a smooth continuous data stream to presentation engine 140.

The time lag of processing data between streaming layer 120 and presentation engine 140 is also a result of a possible lag between temporally co-located audio and video access units in the data stream. For example, if an audio frame and a video frame, which are expected to be rendered simultaneously are separated by one second in the multiplexed stream, buffer 140A would have to be large enough to accommodate at-least one second of the multiplexed stream at the highest possible bit-rate. The lag would be even more for lower bit-rates. The delay may run from 1 to as many as 10 seconds between streaming layer 120 and presentation engine 140.

The time lag of processing data between streaming layer 120 and presentation engine 140 necessitates special synchronization mechanisms to ensure that user actions are effected on what is being currently rendered rather than what is being currently streamed.

For example, if the user wants to activate certain buttons or other features that appear for only a few seconds in the stream, or change every few frames, the streaming layer has to be able to know the exact frame that was being rendered when the user interaction happened.

An example of such a button is what is commonly known as an "Easter Egg". These are "hidden" features placed in a DVD which, when activated by users "in the know", can show special DVD features or other surprises. If the user clicks on the "Easter Egg" button (which may appear as an object on the screen), a hidden scene, feature, or other item may be activated. Other types of buttons or devices, which may be activated within a DVD, exist. The Easter Egg is used here only as an example where synchronization between the streaming layer and presentation layer is important.

If, for example, an Easter Egg is displayed in the video for only a few seconds, and the user tries to click on the button using remote control 155, the intended operation may not work if the streaming layer/presentation engine synchronization is not frame-accurate. An operation of presentation engine 140 is displayed on the screen, whereas user controls are handled by disc access navigator 130, which may not be in sync with presentation engine 140, due to the presence of buffer 140A as well as other delays. Thus, the user may try to activate an operation using remote control 155 in response to an Easter Egg appearing on display 150, but streaming layer 120 has already passed that point in the data stream, and does not recognize the command from remote control 155. At the streaming layer, the Easter Egg may have appeared as many as 1 to 10 previous seconds and is no longer active.

One solution to this problem would be to buffer less data in buffer 140A, and thus have only one to two seconds of discontinuity between the displayed image and the streaming data. However, this "solution" would result in poor performance, as if the DVD is damaged or scratched and needs to be read more than once in any given portion, the data flow may be interrupted, resulting in a jerky or stopped image on display 150. Moreover, if the Easter Egg or other button appears only for a second or two in a scene, even minimal buffering may be insufficient, as the streaming layer will have passed the point in the video where the Easter Egg appears by the time the user can activate remote control 155.

In addition, reducing buffering may make implementing advanced features such as slow reverse, more difficult, if not impossible. Furthermore, a smaller buffer does not always guarantee a smaller time lag since typical DVD-Video encoding (MPEG-2) is Variable Bit-rate. With the same buffer size, one might have a one second lag at one point in the stream, and might have a four second lag at another point. In general, more buffering is better, so such a "solution" is not a viable option for a DVD player.

SUMMARY OF THE INVENTION

The present invention solves the buffering and discontinuity problem of the Prior Art by attaching a "tag" to data as it is streamed from the streaming layer to the presentation engine. Thus, each frame containing a button or other user feature also has a "tag" associated with it. When the presentation engine consumes a packet of data (in other words, renders a packet of data), it updates a state variable with the tag associated with the packet of data. The streaming layer can query this state variable at any point to get the tag associated with the currently rendered unit.

Thus, for example, when the user clicks on an Easter Egg or other button or feature, the streaming layer, rather than looking for an associated function in the data being streamed, instead looks to the tag associated with the frame being displayed and then takes the appropriate action. As a result, the button can be accurate to an individual frame. Thus, for example, an Easter Egg could be displayed on a single frame and the invention would still be able to catch it.

This frame accuracy has other advantages as well. When reversing the video stream in the Prior Art, since the data in the presentation engine is off by 10 seconds (or whatever the buffer size is) the data is often reversed from the point at the end of the buffer. Thus, if the user goes forward frame-by-frame, and then tries to reverse frame-by-frame, the presentation engine may jump FORWARD several seconds before reversing. To a consumer who is used to the frame-by frame forward and reverse features of "jog shuttle" VCR players, this discontinuity between forward and reverse may be annoying.

This discontinuity occurs as the streaming engine does not keep track of which frame is presently being displayed and thus has to feed a buffer of data to the presentation engine. Some consumers may be accept the lack of "frame accurate" in reviewing video data. However, the present invention allows for frame accuracy, and by extension, the possibility of studio-quality editing features (e.g., frame by frame editing) in a consumer-grade appliance.

Another salient feature of the present invention is its completely flexible. The present invention does not impose one buffering size for all stream types. The buffering size can be adjusted individually for different stream types, since the synchronization between the streaming layer and the presentation layer is effected based only on the tags.

DETAILED DESCRIPTION OF THE INVENTION

Figure 1:
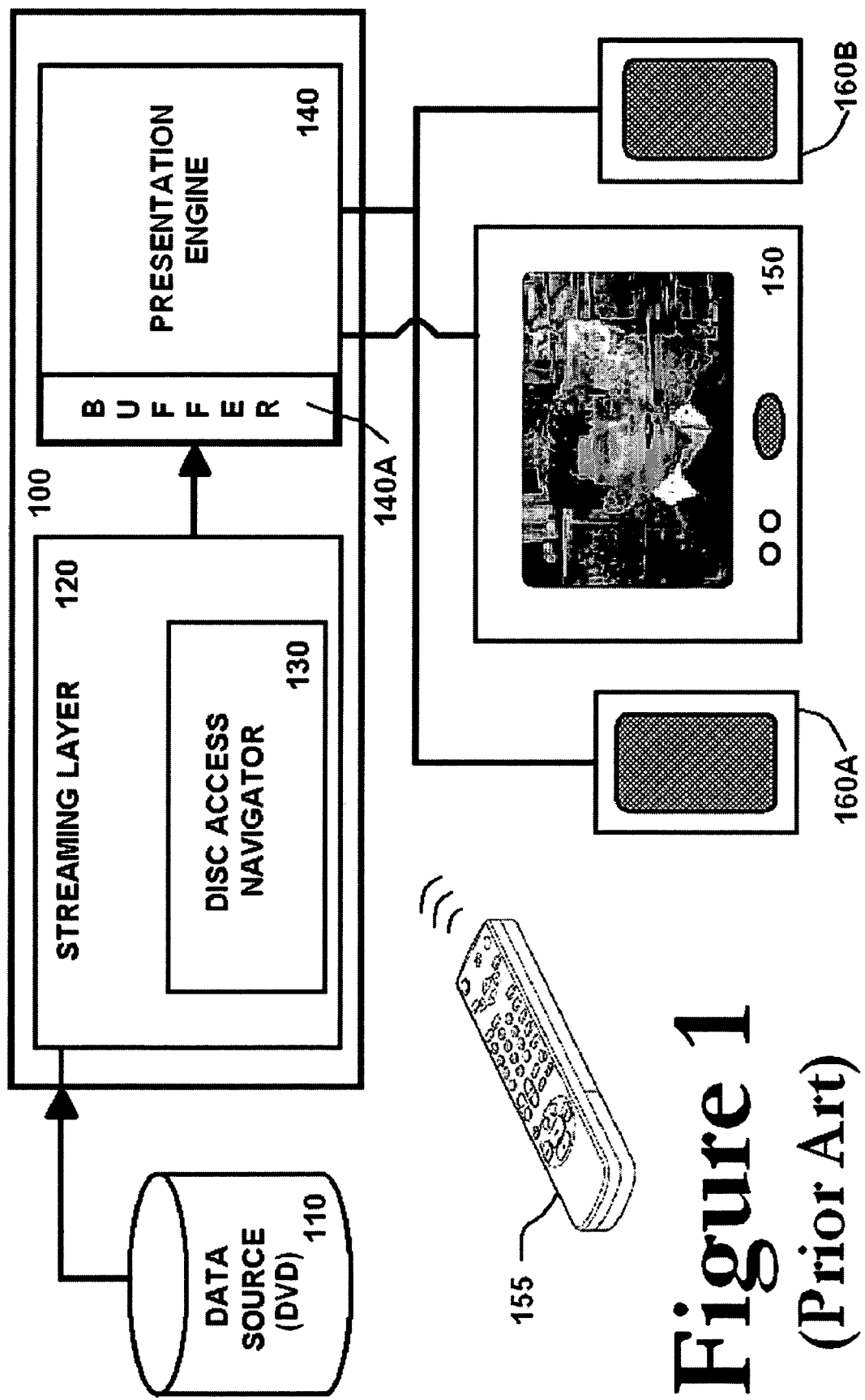
FIG. 1 is a simplified block diagram of a prior art DVD system.
Figure 2:
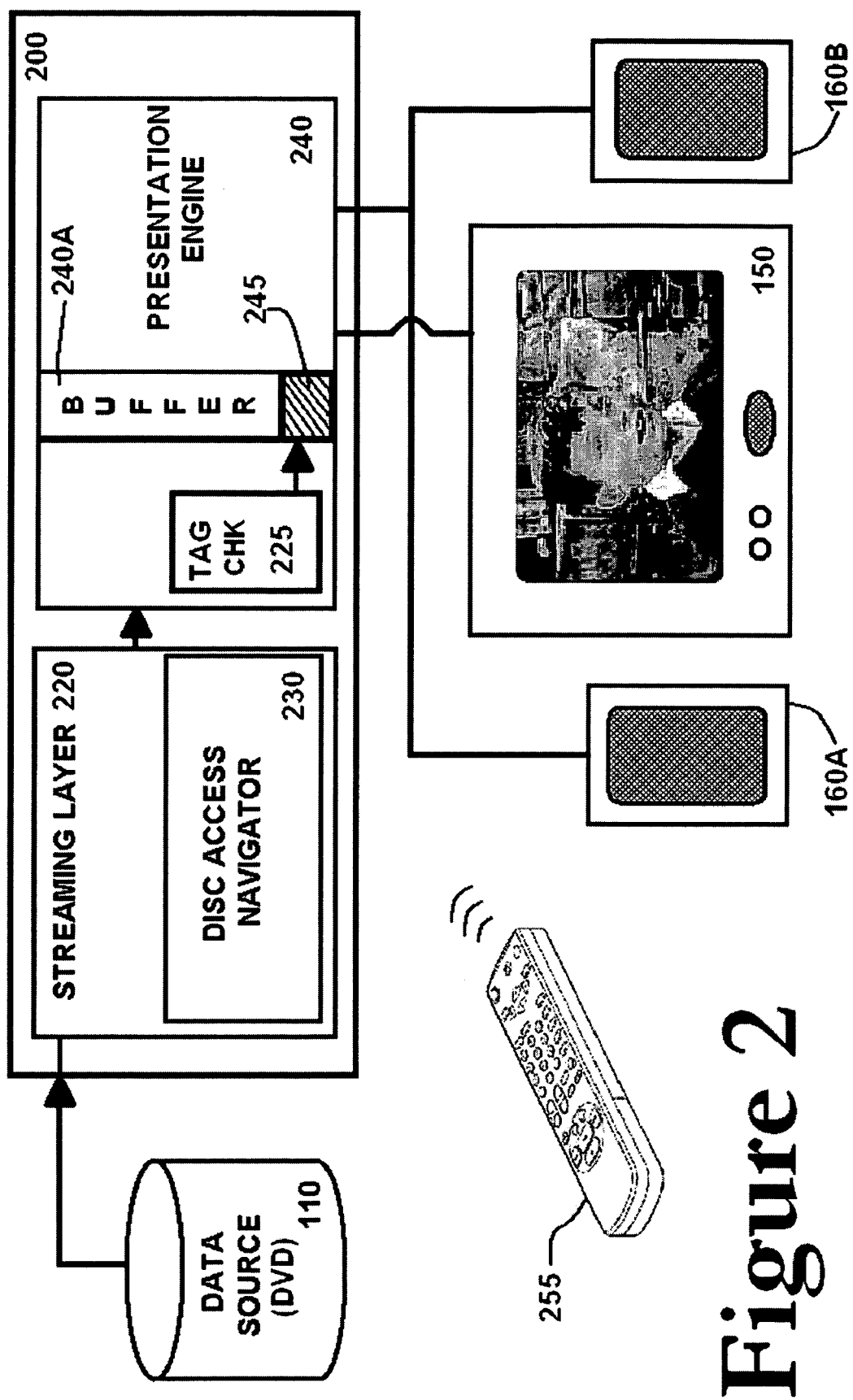
FIG. 2 is a simplified block diagram of the DVD system of the present invention illustrating the use of control tags.

FIG. 2 is a simplified block diagram of the DVD system 200 of the present invention illustrating the use of control tags. Streaming layer 220 attaches a "tag" to data as it is streamed from streaming layer 220 to presentation engine 240. These tags are then stored in tag buffer 245. The association between the data in buffer 240A to tags in tag buffer 245 is such that every frame or packet of data may be associated with only one tag. Thus, each frame containing a button or other user feature also has a "tag" associated with it. The tag may include information relating to the button or function present on the screen, such that data from the tag may be sufficient for disc access navigator 230 to act upon a user command in relationship to the tag based upon the tag data.

Streaming layer 220 receives data from data source 110 which may comprise, for example, a Digital Versatile Disc (DVD) or other video data source. Although in the preferred embodiment, the present invention is directed toward DVD playback equipment (e.g., DVD player), it will be appreciated by one of ordinary skill in the art that the present invention may be applied to other types of applications, including DVD players with hard drive recording systems, hard drive time shifting and recording systems for television signals (e.g., TiVo® and the like), streaming video data over the internet, or other data source.

When the presentation engine 240 consumes and renders a packet of data (e.g., by converting from MPEG-2 to a television format and outputting it for display), it retrieves the tag associated with the frame that was just rendered, and updates a state variable (at tag check block 225) with that tag. Thus, tag check block 225, at any given point of time, reflects the tag associated with the frame that is currently being rendered. Streaming layer 220, may query this state variable, which is at tag check block 225, at any point to get the tag associated with the currently rendered unit. Tag check block 225 may comprise a physical component of streaming layer 220, but in the preferred embodiment is enabled through software and/or firmware within presentation engine 240 of DVD player 200.

When a user clicks on an Easter Egg or other button or feature appearing on display 150, streaming layer 220, rather than looking for an associated operation in the data being streamed within streaming layer 220, instead uses tag check block 225 to check the tag associated with the frame being displayed, as stored in tag portion 245 in tag buffer 240A. From the retrieved tag, disc access navigator 230 may then take an appropriate action, such as playing a video clip, enabling a DVD feature, launching another application, or the like. As a result, the button or Easter Egg may be accurate to an individual frame.

This frame accuracy has other advantages as well. When reversing the video stream in the prior art, since the data in the presentation engine is off by as much as 10 seconds, the data may be reversed from the point at the end of the buffer. Thus, if the user goes forward frame-by-frame, and then tries to reverse frame-by-frame, the presentation engine may jump FORWARD several seconds before reversing. To a consumer used to the frame-by frame forward and reverse features of "jog shuttle" VCR players, this discontinuity between forward and reverse may be annoying.

In the present invention, when a user selects the reverse operation through remote control 255 or other input, disc access navigator 230 may use tag check block 225 to determine the tag associated with the data currently being rendered. Disc Access Navigator 230 may then reverse from the point indicated by the tag (as opposed to the streaming point in streaming layer 220) and thus present a reverse function without temporal discontinuities. As a result, a user can play in reverse and forward, at normal speed or frame-by-frame, in a frame-accurate manner, without the discontinuities known in prior art DVD players and the like.

Such frame accuracy may allow a user to use a DVD player or other MPEG-2 or similar data stream as source video for editing and recording purposes. In the prior art, MPEG-2 data streams have not been widely utilized in video editing, as a decoded data stream with frame-accurate editing features was required in order to transition back and forth through a video on a frame-by-frame basis. The present invention, particularly when used in conjunction with smooth slow-reverse features disclosed in co-pending U.S. patent application Ser. No. 10/948,745 entitled "OPTIMAL BUFFERING AND SCHEDULING STRATEGY FOR SMOOTH REVERSE IN A DVD PLAYER OR THE LIKE", filed on Sep. 24, 2004, and incorporated herein by reference.

Figure 3:
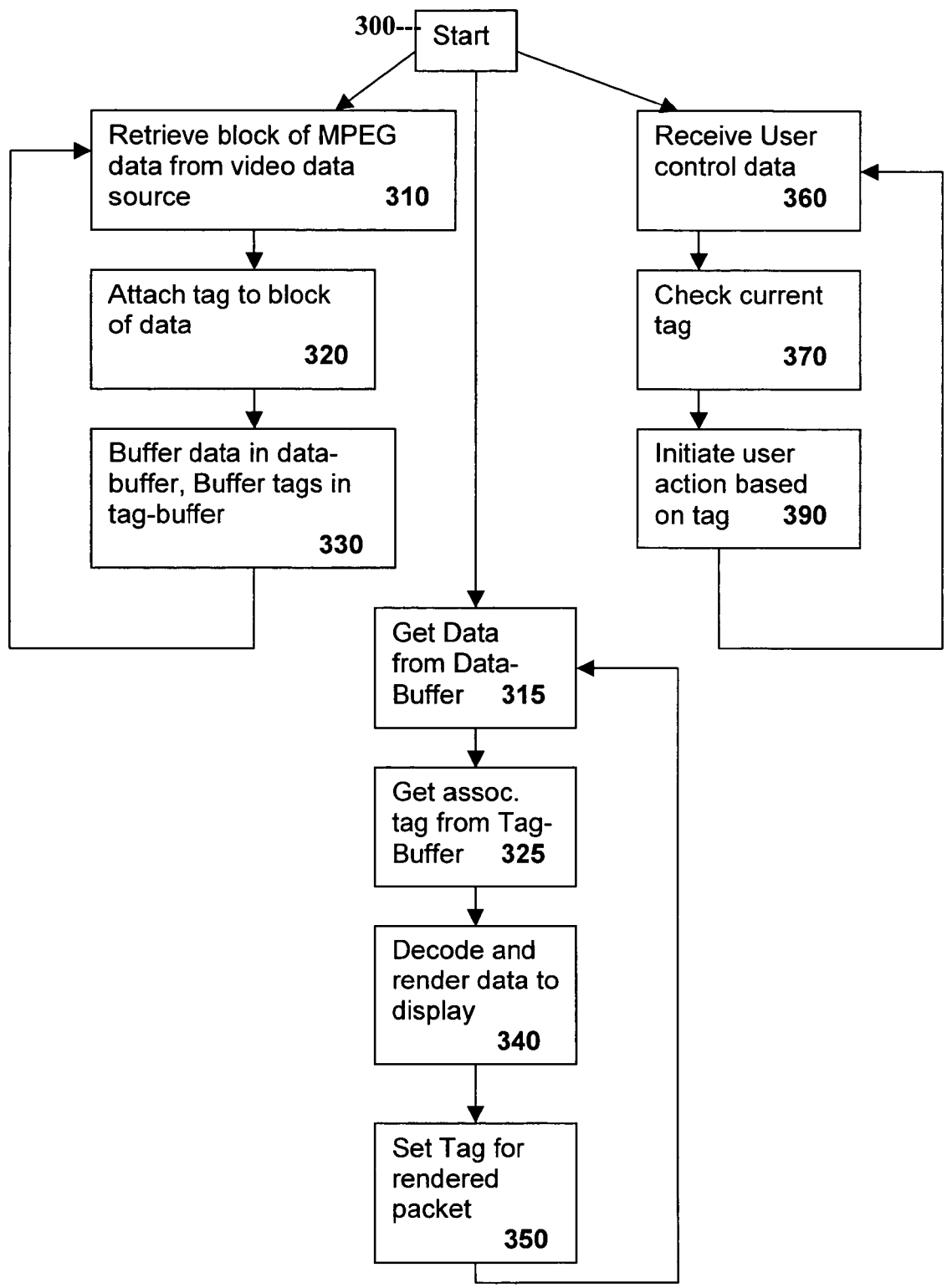
FIG. 3 is a simplified flowchart illustrating the process for creating and using tags to synchronize the streaming layer and presentation engine in a DVD system.

FIG. 3 is a simplified flowchart illustrating the process in creating and using tags to synchronize the streaming layer and presentation engine in a DVD system. Three concurrent processes are taking place as illustrated in FIG. 3. When an MPEG-2 data stream is to be decoded, as indicated by START 300, data is streamed from the MPEG-2 video data source as indicated in block 310. In the preferred embodiment, an MPEG-2 data source is shown. However, the present invention may also be applied to other types of video data as well as other types of data streams wherever there is a need for tight synchronization between streaming and presentation/decoding layers.

As illustrated in block 320, during the streaming process, tags are attached to data packets as they are streamed from the data source. The data source may comprise a DVD, HD-DVD, Internet data stream, data from a hard drive, or other data source. The tags may not be "attached" per se to the data packets, but may be generated and stored concurrently such that a temporal (ordered) relationship exists between the tag and data packet. Alternately, the tag may be embedded into a portion of the data packet unused by the presentation engine, such that the overall format data packet is not affected by the insertion of the data tag. In an MPEG-2 data stream, data packets may comprise different types of frames (e.g., I-type, P-type, B-type) or groups of frames. In the preferred embodiment, the tag may be separate from the packets, such that the tag status may be readily checked to determine which packets have been processed.

In block 330, the data packets and tags are stored in a buffer in the presentation engine, so the presentation engine can decode and output the packet data as an image on display 150. The buffer may comprise a circular buffer, such that packets may be present in the buffer for a period of time after decoding, until overwritten by new data packets.

As part of the second process, streaming data is retrieved from the data buffer in step 315. Associated tag data for the streaming data may also be retrieved from the tag buffer in step 325. In block 340, the presentation engine decodes a packet of data and generates frames of video data for presentation on display 150 or the like. Each frame may have an associated tag, or tags may be generated only for a certain interval of frames, or frames having buttons Easter Eggs, or the like. In block 350, the tag for a decoded frame is set, indicating that the frame or packet of data has been decoded and sent to the display 150. The process is repeated so long as MPEG-2 data is being streamed and decoded.

Concurrently with the streaming process and the decoding process, a third process is taking place in the streaming layer 120, in particular with regard to disc access navigator 230. The process in initiated in block 360, when a control command is received from a user, for example, by way of remote control 255. When a command is received, disc access navigator 240 may first check in block 370 the current tag relating to the block of data or frame of data being displayed via tag check 225, which will return the tag associated with the current packet under rendition. In block 390, from the tag query, the currently displayed frame, and any associated user control information, like the number of buttons, menus, or the like may be determined and any user action may be initiated based upon this information.

Thus, for example, if a user clicks upon a portion of a screen showing a button or Easter Egg, disc access navigator 230 will respond to that input relative to the frame being displayed, not the packet being streamed. If a button or Easter Egg is present in the frame being displayed, disc access navigator 230 may act upon the user input in relationship to the frame being displayed, based upon the tag data.

As previously noted, tags may be provided for each frame of data, which enables disc access navigator to provide full frame-by-frame shuttling in either direction. In this embodiment, before freezing, fast forwarding, reversing, slow-motion, or performing other disc access operations, the current tag query is made in block 370 such that disc access navigator can reverse, freeze, or the like from the current frame. Unlike prior art DVD players, the use of tags allows for smooth transition between modes of operation without temporal discontinuities (e.g., jumping ahead) between modes of operation.

While the preferred embodiment and various alternative embodiments of the invention have been disclosed and described in detail herein, it may be apparent to those skilled in the art that various changes in form and detail may be made therein without departing from the spirit and scope thereof.

I claim:

1. An apparatus for converting streaming video data to display video data comprising:

a streaming layer for receiving encoded video data from a video data source the streaming layer including a navigation portion for navigating the encoded video data from the video data source, the streaming layer creating at least one tag for each portion of the encoded video data from the video data source to create associated tags for the portions of the encoded video data; and a presentation engine, coupled to the streaming layer, for receiving the encoded video data from the video data source and decoding the video data to produce display video data, the presentation engine buffering the encoded video data and an associated tags, wherein, in response to a user input the navigation portion of the streaming layer determines a current portion of the display video data based upon a buffered tag, and responds to the user input relative to the current portion of the display video data, wherein the presentation engine sets a state variable with an associated tag when a portion of the encoded video data is decoded and wherein when the presentation engine processes a packet of data, it updates a state variable with the tag associated with the packet of data, and the streaming layer queries the state variable at any point in streaming data to get the tag associated with a currently rendered unit.

2. The apparatus of claim 1, wherein the encoded video data comprises MPEG-2 video data.

3. The apparatus of claim 2, wherein the video data source comprises a DVD.

4. The apparatus of claim 3, wherein the current portion of the video display data comprises a current frame of video display data.

5. The apparatus of claim 4, wherein the user input comprises an input from a user to select a button or feature within at least one frame of video display data, wherein the navigation portion of the streaming layer determines a current frame of the display video data and responds to the user input relative to the button or feature in the current frame of the display video data.

6. A DVD player including:
a streaming layer for receiving encoded video data from a DVD, the streaming layer including a navigation portion for navigating the DVD, the streaming layer creating associated tags for corresponding portions of the encoded video data from the DVD; and
a presentation engine, coupled to the streaming layer, for receiving the encoded video data from the DVD and decoding the video data to produce display video data the presentation engine buffering the encoded video data and the associated tags,
wherein, in response to a user input the navigation portion of the streaming layer determines a current portion of the display video data and responds to the user input relative to the current portion of the display video data,
wherein the presentation engine sets a state variable in the tag when a corresponding portion of the encoded video data is decoded, and
wherein when the presentation engine processes a packet of data, it updates a state variable with the tag associated with the packet of data, and
the streaming layer queries the state variable at any point in streaming data to get the tag associated with a currently rendered unit.

7. The DVD player of claim 6, wherein the encoded video data comprises MPEG-2 video data.

8. The DVD player of claim 7, wherein the current portion of the video display data comprises a current frame of video display data.

9. The DVD player of claim 8, wherein the user input comprises an input from a user to select a button or feature within at least one frame of video display data, wherein the navigation portion of the streaming layer determines a current frame of the display video data and responds to the user input relative to the button or feature in the current frame of the display video data.

10. The DVD player of claim 8, wherein the user input comprises an input from a user to play a selected portion of a DVD, wherein the navigation portion of the streaming layer determines a current frame of the display video data and responds to the user input relative to the button or feature in the current frame of the display video data.

11. A method for converting streaming video data to display video data comprising:
receiving in a streaming layer, encoded video data from a video data source,
creating, in the streaming layer, associated tags for corresponding portions of the encoded video data from the video data source,
receiving in a presentation engine coupled to the streaming layer, the encoded video data from the video data source and the associated tag,
buffering in the presentation engine, the encoded video data and the associated tags,
decoding, in the presentation engine, the video data to produce display video data,
receiving in a navigation portion of the streaming layer a user input command for navigating the encoded video data from the video data source, and
determining in the navigation portion of the streaming layer a current portion of the display video data and responding to the user input relative to the current portion of the display video data,
wherein decoding further comprises setting a state variable in the tag when a corresponding portion of the encoded video data is decoded, and
wherein decoding further comprises updating a state variable with the tag associated with the packet of data when the presentation engine processes a packet of data, and
determining further comprises the streaming layer querying the state variable at any point in streaming data to get the tag associated with a currently rendered unit.

12. The method of claim 11, wherein the encoded video data comprises MPEG-2 video data.

13. The method of claim 12, wherein the video data source comprises a DVD.

14. The method of claim 13, wherein the current portion of the video display data comprises a current frame of video display data.

15. The method of claim 13, wherein receiving, in a navigation portion of the streaming layer, a user input command for navigating the encoded video data from the video data source comprises receiving an input from a user to select a button or feature within at least one frame of video display data, and
wherein determining, in the navigation portion of the streaming layer, a current portion of the display video data and responding to the user input relative to the current portion of the display video data comprises determining a current frame of the display video data and responds to the user input relative to the button or feature in the current frame of the display video data.

* * * * *